(12) United States Patent
LaRosa

(10) Patent No.: US 9,491,940 B2
(45) Date of Patent: Nov. 15, 2016

(54) APPARATUS AND METHOD FOR DISPENSING AN ANIMAL ATTRACTANT

(71) Applicant: Francis Ross LaRosa, Moorestown, NJ (US)

(72) Inventor: Francis Ross LaRosa, Moorestown, NJ (US)

(*) Notice: Subject to any disclaimer, the term of this patent is extended or adjusted under 35 U.S.C. 154(b) by 343 days.

(21) Appl. No.: 14/055,263

(22) Filed: Oct. 16, 2013

(65) Prior Publication Data

US 2015/0102122 A1    Apr. 16, 2015

Related U.S. Application Data

(60) Provisional application No. 61/790,063, filed on Mar. 15, 2013.

(51) Int. Cl.
*A01K 97/02* (2006.01)
*A01M 31/00* (2006.01)

(52) U.S. Cl.
CPC .................. *A01M 31/008* (2013.01)

(58) Field of Classification Search
CPC .. A01M 31/008; A01K 5/0114; A01K 97/02
USPC ........ 239/1, 34–60; 222/173, 174, 478, 211, 222/284, 196.1, 456.1, 475.1, 465.1, 468; 102/449; 43/1; 473/507, 505, 510, 513
See application file for complete search history.

(56) References Cited

U.S. PATENT DOCUMENTS

| | | | | | |
|---|---|---|---|---|---|
| 2,527,955 | A | * | 10/1950 | Pagel | E03D 9/04 292/347 |
| 2,738,224 | A | * | 3/1956 | Checkovich | A61L 9/12 239/57 |
| 2,763,395 | A | * | 9/1956 | Meek | B05B 11/00 220/23.89 |
| 3,727,840 | A | * | 4/1973 | Nigro | A61L 9/127 239/43 |
| 6,199,311 | B1 | * | 3/2001 | Foster | A01M 31/008 102/506 |
| 6,241,161 | B1 | * | 6/2001 | Corbett | A01M 31/008 222/187 |
| 6,241,629 | B1 | * | 6/2001 | Otto | 473/457 |
| 6,513,279 | B1 | * | 2/2003 | Hernandez | A01K 97/02 43/44.99 |
| 7,225,584 | B1 | * | 6/2007 | Speidell | A01K 97/02 43/4 |
| 7,694,629 | B2 | * | 4/2010 | Pawloski | A01M 27/00 102/502 |
| 7,975,655 | B2 | * | 7/2011 | Piaget | A01K 15/025 119/51.01 |
| 8,201,521 | B2 | * | 6/2012 | Shirley | A01K 5/00 119/51.03 |
| 8,444,512 | B2 | * | 5/2013 | Pierce | A61L 9/12 473/578 |
| D703,804 | S | * | 4/2014 | Nuzzi, Jr. | D23/366 |
| 2005/0127538 | A1 | * | 6/2005 | Fabrega | A01M 1/2033 261/104 |
| 2008/0313947 | A1 | * | 12/2008 | Fachner | A01M 31/008 43/1 |

OTHER PUBLICATIONS

Shot Scent, The Shot Scent Dispenser Wand, Aug. 16, 2012, http://web.archive.org/web/20120916181517/http://www.nuzzioutdoors.com/category-s/1823.htm.*
Shot Scent, Created for Deer Hunters by Deer Hunters, Aug. 16, 2012, http://web.archive.org/web/20120916000155/http://www.nuzzioutdoors.com/Why-Our-Deer-Scents-s/1817.htm.*
NuzziOutdoors, Shot Scent 1 How does it work,: Aug. 8, 2012, https://www.youtube.com/watch?v=alphTFLAJLM.*

* cited by examiner

*Primary Examiner* — Arthur O Hall
*Assistant Examiner* — Joseph A Greenlund
(74) *Attorney, Agent, or Firm* — James M. Smedley LLC; James Michael Smedley, Esq.

(57) ABSTRACT

The present invention relates to attractants for game animals. Specifically, the invention relates to a porous, natural shot material that can retain an attractant scent, as well as a related apparatus and method of dispersal.

7 Claims, 4 Drawing Sheets

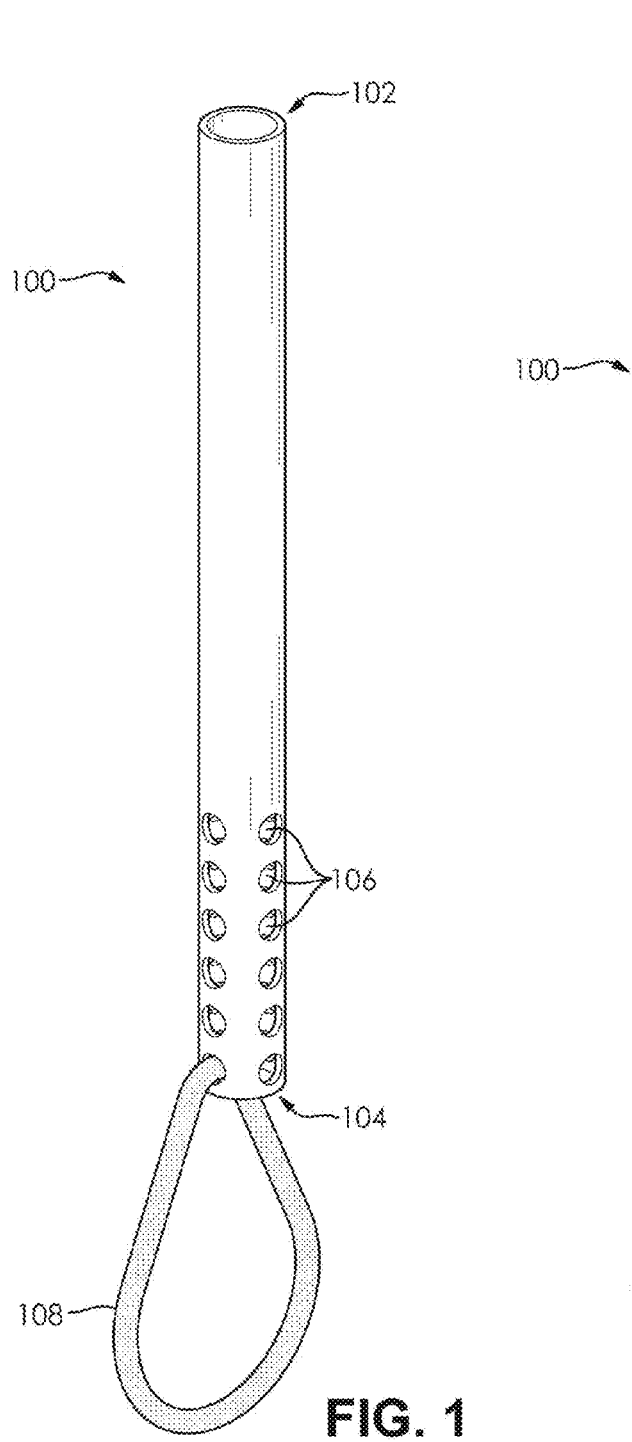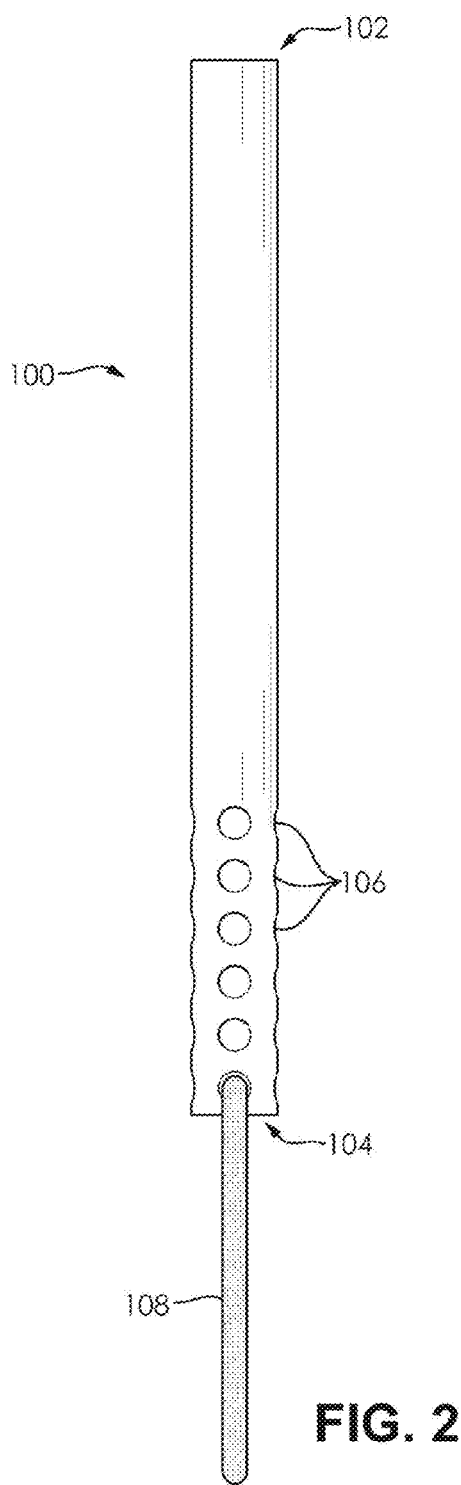

APPARATUS AND METHOD FOR DISPENSING AN ANIMAL ATTRACTANT

CROSS-REFERENCE TO RELATED APPLICATIONS

This application claims the benefit of the following provisional application, each of which is hereby incorporated by reference in its entirety: U.S. Pat. App. No. 61/790,063 filed on Mar. 15, 2013 and entitled "SYSTEM AND METHOD FOR DISPENSING AND ANIMAL ATTRACTANT."

FIELD OF THE INVENTION

The present invention relates to attractants for game animals. Specifically, the invention relates to a porous, natural shot material that can retain an attractant scent, as well as a related apparatus and method of dispersal.

BACKGROUND OF THE INVENTION

In hunting and other game sports, sportsmen use a variety of techniques to increase their odds of having a successful hunt. One popular technique that is often employed is the use of attractants or other scents that are used to entice game animals to a particular area. Currently, these attractants require a hunter to walk around to disperse the attractant. This is a considerable drawback, as the hunter then contaminates the area with their own scent. Additionally, many of the attractants are not eco-friendly and are made of synthetic and non-biodegradable materials.

Therefore, there is a need in the art for an animal attractant that is both eco-friendly and more effectively dispersed without contaminating the hunting area. These and other features and advantages of the present invention will be explained and will become obvious to one skilled in the art through the summary of the invention that follows.

SUMMARY OF THE INVENTION

The present invention provides an animal attract in the form of a natural, porous shot material, in addition to an apparatus and method for dispersing the shot material. In a preferred embodiment, the shot is dispersed with the assistance of an apparatus that enables the shot to be spread over a greater distance.

According to an embodiment of the present invention, an apparatus for dispensing animal attractant includes: a tube, comprising a tube divider formed in an interior portion of said tube creating a dispenser chamber and a handle portion, wherein said tube divider separates said dispenser portion from said handle portion, wherein said dispenser chamber is at a first end of said tube and said handle portion is at a second end of said tube with said first end and second end being on opposite ends of one another, and wherein said dispenser portion is configured to receive a shot material via an opening at said first end of said tube, wherein said shot material is dispensed from said apparatus with a casting motion.

According to an embodiment of the present invention, the shot material is a natural material.

According to an embodiment of the present invention, the shot material is a porous material.

According to an embodiment of the present invention, the shot material is configured to retain a scent.

According to an embodiment of the present invention, the dispenser portion is configured with an angled opening.

According to an embodiment of the present invention, the angled opening is configured with an angle between zero and ninety degrees.

According to an embodiment of the present invention, the handle portion is further comprised of a lanyard.

According to an embodiment of the present invention, the handle portion is configured as a scent material storage compartment.

According to an embodiment of the present invention, the handle portion is further comprised of one or more cover scent emitting holes.

According to an embodiment of the present invention, a method for dispensing animal attractant includes the steps of: preparing a shot material, wherein said shot material is loaded with a scent; loading said shot material into a dispersal apparatus; launching said shot with said apparatus; wherein a user cocks said apparatus at forward angle behind said user's head and casts said apparatus forward to launch said shot from said apparatus.

According to an embodiment of the present invention, the shot material is preloaded with said scent by a manufacturer.

According to an embodiment of the present invention, the shot material is loaded with said scent by an end user.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 1 is perspective view of an apparatus for dispensing an animal attractant in accordance with an embodiment of the present invention;

FIG. 2 is a side view of an apparatus for dispensing an animal attractant in accordance with an embodiment of the present invention;

DETAILED DESCRIPTION OF THE INVENTION

Figure 3:
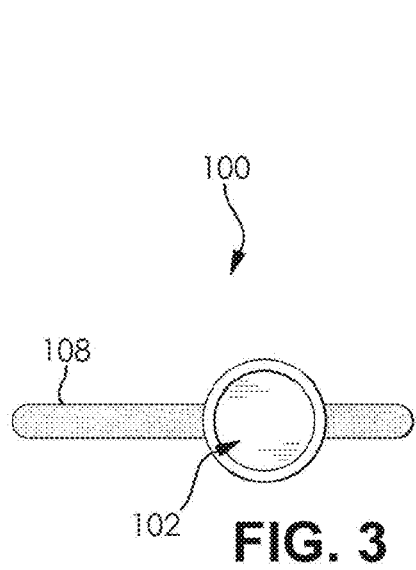
FIG. 3 is a top view of an apparatus for dispensing an animal attractant in accordance with an embodiment of the present invention.

The present invention relates to attractants for game animals. Specifically, the invention relates to a porous, natural shot material that can retain an attractant scent, as well as a related apparatus and method of dispersal.

According to an embodiment of the present invention, an animal attractant is comprised of a shot material. In a preferred embodiment, the shot material is comprised of a porous, natural material, preferably a coarse ground stone material. The shot material is preferably porous to allow the shot material to absorb any scent that is applied to it. The shot material is preferably a natural material, such as stone, so that the shot material will be eco-friendly. In an alternate embodiment, the shot may be a bio-degradable, porous material. One of ordinary skill in the art would appreciate that there are numerous porous, natural materials that could be utilized as shot material, and embodiments of the present invention are contemplated for use with any such material porous, natural material.

According to an embodiment of the present invention, the shot material is small pellets. In a preferred embodiment, the small pellets make the shot material easier to disperse. In particular using small pellets for the shot material helps to ensure that the shot material, and thereby an attractant, is spread out over a larger area. For example, when dispersing the shot material made of small pellets, the pellets hit off of various surfaces in the hunting area, such as rocks, trees, branches, leaves, and other surfaces, that help spread the scent out over a larger area. Additionally, using smaller shot material helps to ensure that the scent is more evenly distributed, whereas using larger shot material may concentrate the scent in a smaller area. In alternate embodiments, the shot material may be larger or smaller, depending upon the specific application and requirements of the user. For example, in certain embodiments larger shot material may be beneficial when a user desires to more densely concentrate the scent in a smaller area. One of ordinary skill in the art would appreciate that the shot material would be effective in a variety of sizes, and embodiments of the present invention are contemplated for use with any size shot material.

According to an embodiment of the present invention, the shot material is loaded with a scent. In a preferred embodiment, the scent is an animal attractant that is applied to and absorbed by the porous shot material. The type of scents that may be loaded onto the shot material include, but are not limited to, doe (female deer) scents, buck (male deer) scents, and food scents that mimic the smells of a variety of food sources. A user can vary the scent that is loaded onto the shot material in order to best attract the animal that they are hunting. One of ordinary skill in the art would appreciate that there are numerous scents that could be loaded onto the shot material, and embodiments of the present invention are contemplated for use with any such scent.

According to an embodiment of the present invention, the shot material is loaded with a scent. In a preferred embodiment, the scent is loaded onto the shot material by a user. This embodiment is useful as it allows a user to apply which ever scent is desired to the shot material. In an alternate preferred embodiment, a scent is preloaded onto the shot material during the manufacturing process. This embodiment is useful as it provides convenience to a user by saving the time required to separately load a scent onto the shot material. One of ordinary skill in the art would appreciate that scent could be loaded onto the shot material through a number of processes, and embodiments of the present invention are contemplated for use with any such process.

According to an embodiment of the present invention, an apparatus for dispensing an animal attractant is primarily comprised of a tube. In a preferred embodiment, the tube is comprised of a tube divider, a dispenser chamber, and a handle portion. In the preferred embodiment, the tube is approximately twelve (12) inches long. In alternate embodiments the tube may be comprised of more or fewer components and of varying lengths. In the preferred embodiment, the tube is primarily comprised of a plastic material. In an alternate embodiment, the tube may be primarily comprised of a metal. One of ordinary skill in the art would appreciate that an apparatus for dispensing animal attractants may be designed in any number of configurations, and embodiments of the present invention are contemplated for use with any such configuration.

According to an embodiment of the present invention, a tube of an apparatus for dispensing an animal attractant is comprised of a tube divider. In a preferred embodiment, the tube divider is formed on an interior portion of the tube creating a dispenser chamber and a handle portion. In the preferred embodiment, the tube divider is formed approximately four (4) inches in from one end of the tube. The resulting preferred embodiment is an apparatus for dispensing animal attractant with a dispenser chamber that is approximately eight (8) inches long and a handle portion that is approximately four (4) inches long. In alternate embodiment, the tube may be longer or shorter than twelve (12) inches. In such alternate embodiments of varying lengths, the tube divider is preferably formed inside the tube approximately one-third of the way from one end of the tube. Such a configuration provides for a dispenser chamber that is approximately two-thirds of the length of the tube and a handle portion that is approximately one-third of the length of the tube. In further alternate embodiments, the tube divider could be configured as an end cap at one end of the tube, creating a dispenser chamber that is the entire length of the tube and a handle portion that is simply the outer surface of the tube. One of ordinary skill in the art would appreciate that the tube divider could be formed at any position along the interior of the tube, and embodiments of the present invention are contemplated for use with any such position of the tube divider.

According to an embodiment of the present invention, a tube of an apparatus for dispensing an animal attractant is comprised of a dispenser chamber. In a preferred embodiment, the dispenser chamber is created when the tube divider is formed on an interior portion of the tube. In the preferred embodiment, the dispenser chamber is formed by the interior walls of the tube and the tube divider, creating a compartment with an opening formed by the open end of the tube. One of ordinary skill in the art would appreciate that the dispenser chamber could be formed in a variety of configurations and embodiments of the present invention are contemplated for use with any such configuration.

According to an embodiment of the present invention, the dispenser chamber is configured to receive and dispense shot material. In a preferred embodiment, loose shot material is loaded into the open end of the dispenser chamber. The entire apparatus is then moved with a casting motion by the user, thereby ejecting the shot material from the dispenser chamber and distributing the shot material over the hunting area. In alternate embodiment, the shot material is contained within a pouch or similar structure, which makes the shot material easier to load in to the dispenser chamber. In this alternate embodiment, the shot material is still ejected from the dispenser chamber with a casting motion. Casting the shot material from the dispenser chamber causes the pouch or similar structure containing the shot material to break apart and release the shot material. In another alternate embodiment, the apparatus for dispensing animal attractant is a one-time use device. In this alternate embodiment, the dispenser chamber is pre-filled with the shot material that is loaded with a particular scent. The top of the dispenser chamber is sealed with a removable cover or similar lid-like structure. To eject the shot material from the dispenser chamber, the user removes the cover from the dispenser chamber opening and casts the shot material as desired. Alternatively, the cover may be sufficiently fragile to allow the shot material to break through the cover when the casting motion is performed, yet sufficiently strong to retain the shot material during storage and transport of the apparatus. One of ordinary skill in the art would appreciate that there are numerous methods for loading shot material into the dispenser chamber, and embodiments of the present invention are contemplated for use with any such method.

According to an embodiment of the present invention, the dispenser chamber is open at one end to facilitate the discharge of shot material. In a preferred embodiment the open end of the dispenser chamber is angled to enable the user to more efficiently eject shot material from the dispenser chamber. In the preferred embodiment the opening of the dispenser chamber is angled at approximately 45°. In alternate embodiments, the opening of the dispenser chamber is formed with angle between 0-90°. One of ordinary skill in the art would appreciate that the opening of the dispenser chamber could be configured with a range of beneficial angles, and embodiments of the present invention are contemplated for use with any such angle.

According to an embodiment of the present invention, a tube of an apparatus for dispensing an animal attractant is comprised of a handle portion. In a preferred embodiment, the handle portion is created when the tube divider is formed on an interior portion of the tube. In the preferred embodiment, the handle portion is formed by the walls of the tube that extend away from the tube divider in the opposite direction of the dispenser chamber. One of ordinary skill in the art would appreciate that the handle portion could be formed in a variety of configurations and embodiments of the present invention are contemplated for use with any such configuration.

According to an embodiment of the present invention, the handle portion may be configured to store shot material. In a preferred embodiment, the handle portion is a storage compartment formed is by the interior walls of the tube and the tube divider, creating a storage compartment with an opening formed by the open end of the tube. In the preferred embodiment, the open end of the storage compartment is configured with a removable lid or similar closing means. One of ordinary skill in the art would appreciate that the handle portion could be configured to additionally function as a storage compartment through a variety of designs, and embodiments of the present invention are contemplated for use with any such design.

According to an embodiment of the present invention, the storage compartment may be configured with one or more cover scent emitting holes. In a preferred embodiment, shot material that has been loaded with scent is added to the storage compartment. The one or more cover scent emitting holes then allow the scent of the shot material to emanate from the storage compartment and serve as a cover scent for the user. In the preferred embodiment, the one or more scent emitting holes are formed by adding one or more holes to the tube wall of the handle portion of the tube. In one preferred embodiment, the one or more holes are small enough to prevent the shot material from falling out through the holes. In an alternate embodiment the interior portion of the tube wall may be lined with a mesh or similar material to allow the one or more cover scent emitting holes to be larger than the shot material. One of ordinary skill in the art would appreciate that there are numerous designs for a storage compartment with cover scent emitting holes, and embodiments of the present invention are contemplated for use with any such design.

According to an embodiment of the present invention, the one or more cover scent emitting holes may be workably opened and closed. In a preferred embodiment, the one or more scent emitting holes, along with the handle portion, may be configured with a rotatable inner wall portion that is configured to fit on the interior wall of the tube and engage with the lid of the storage compartment. In this embodiment, a user could rotate the inner wall portion by turning the lid to selectively open and close the one or more scent emitting holes. In an alternate preferred embodiment, a series of movable slats or covers may be manipulated to either open or seal the one or more cover scent emitting holes. One of ordinary skill in the art would appreciate that the one or more cover scent emitting holes could be opened and closed through a variety of configurations, and embodiments of the present invention are contemplated for use with any such configuration.

According to an embodiment of the present invention, a tube of an apparatus for dispensing an animal attractant is comprised of a lanyard. In a preferred embodiment, the lanyard is attached to the handle portion of the tube. In the preferred embodiment, the lanyard may serve a number of important purposes, including, but not limited to: 1) a means to secure the apparatus to a user's wrist during the casting of the shot material, 2) a means to secure the apparatus in a hanging position when the shot material in the storage compartment is being used as a cover scent, and 3) as means to secure the apparatus for storage or transport, for example on the belt or pack of a user. In the preferred embodiment, the lanyard is made of a soft nylon material. One of ordinary skill in the art would appreciate that there are many practical uses and configurations for a lanyard, and embodiments of the present invention are contemplated for use with any such use or configuration.

Exemplary Embodiments

Turning now to FIG. 1, a perspective view of an apparatus for dispensing an animal attractant in accordance with an embodiment of the present invention. In this illustration, a preferred embodiment of an apparatus for dispensing an animal attractant 100 is shown with the apparatus 100 having a substantially tubular shape. At one end of the apparatus 100 is the dispenser chamber 102 and at the opposite end is the handle portion 104. The handle portion further includes one or more cover scent emitting holes 106 and a lanyard 108.

Turning now to FIG. 2, a side view of an apparatus for dispensing an animal attractant in accordance with an embodiment of the present invention. In this illustration, a preferred embodiment of an apparatus for dispensing an animal attractant 100 is shown with the apparatus 100 having a substantially tubular shape. At one end of the apparatus 100 is the dispenser chamber 102 and at the opposite end is the handle portion 104. The handle portion further includes one or more cover scent emitting holes 106 and a lanyard 108.

Turning now to FIG. 3, a top view of an apparatus for dispensing an animal attractant in accordance with an embodiment of the present invention. In this illustration, a preferred embodiment of an apparatus for dispensing an animal attractant 100 is shown with the apparatus 100 having a substantially tubular shape. The dispenser chamber 102 is a compartment where shot material may be added and the dispersed by a user through a casting motion. A lanyard 108 can be seem at the opposite end of the apparatus 100.

Figure 4:
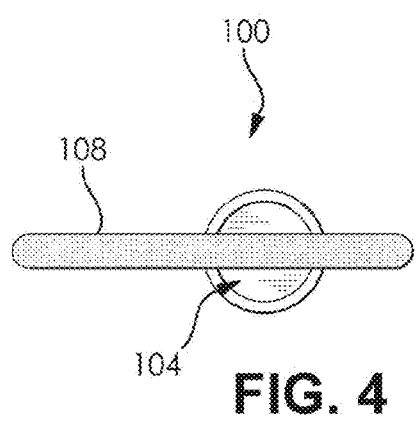
FIG. 4 is a bottom view of an apparatus for dispensing an animal attractant in accordance with an embodiment of the present invention.

Turning now to FIG. 4, a bottom view of an apparatus for dispensing an animal attractant in accordance with an embodiment of the present invention. In this illustration, a preferred embodiment of an apparatus for dispensing an animal attractant 100 is shown with the apparatus 100 having a substantially tubular shape. The handle portion 104 is configured to include a lanyard 108 that may be used to secure the apparatus 100 to the wrist of a user when shot material is dispersed.

Figure 5:
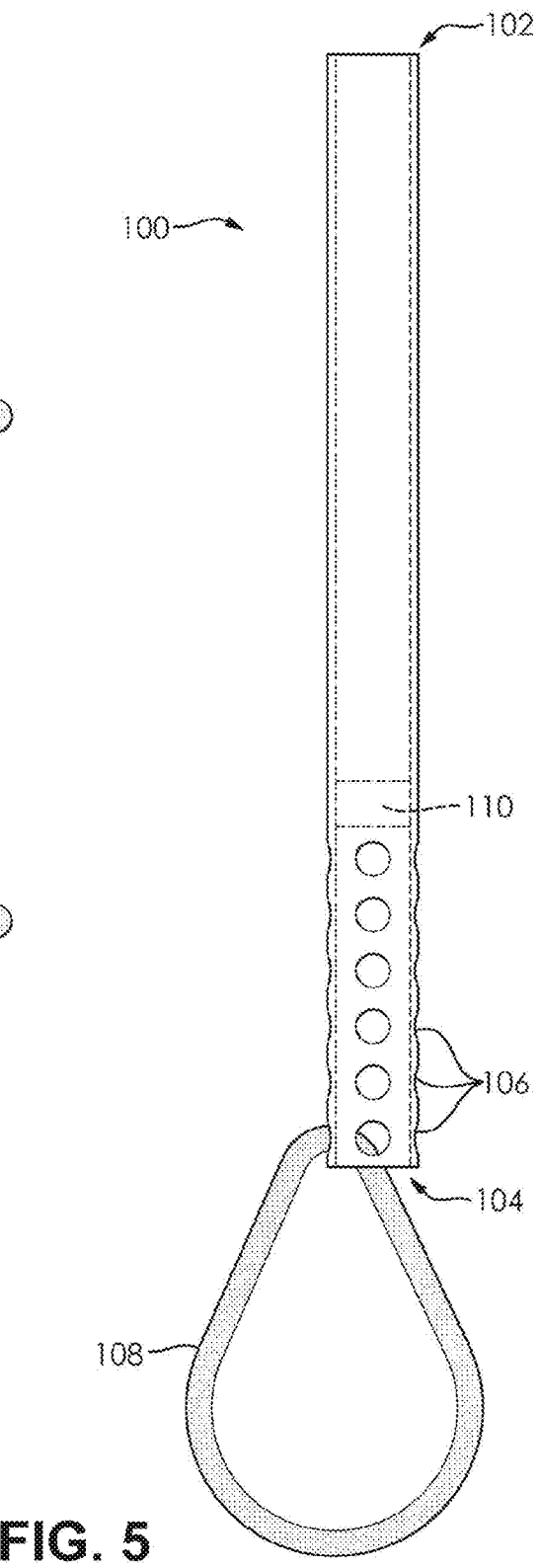
FIG. 5 is a side view of an apparatus for dispensing an animal attractant in accordance with an embodiment of the present invention.

Turning now to FIG. 5, a side view of an apparatus for dispensing an animal attractant in accordance with an embodiment of the present invention. In this illustration, a preferred embodiment of an apparatus for dispensing an animal attractant 100 is shown, including the internal structure of the apparatus 100, which is substantially tubular in shape. At one end of the apparatus 100 is the dispenser chamber 102 and at the opposite end is the handle portion 104. The handle portion further includes one or more cover scent emitting holes 106 and a lanyard 108. In addition, the internal structure of the apparatus 100 is plainly visible. The tube divider 110 is formed on the interior portion of the tube that comprises the apparatus 100. The tube divider 110 creates the dispenser chamber 102 and the handle portion 104.

Figure 6:
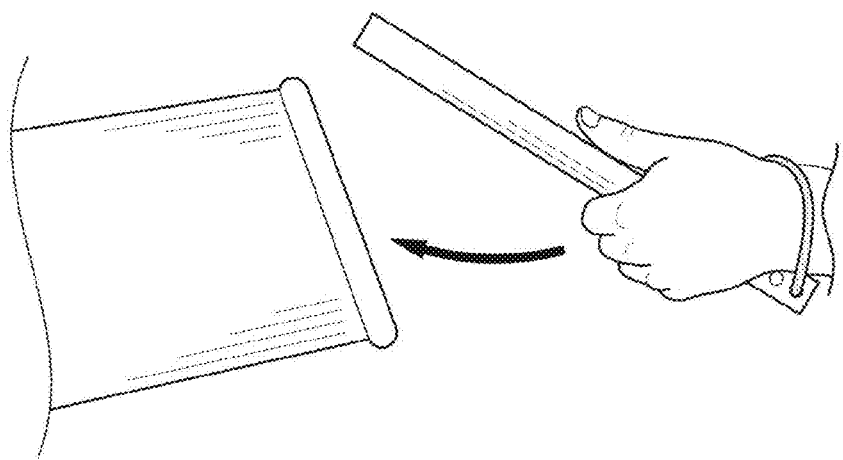
FIG. 6 is an illustrative example of a method for loading shot material into an apparatus for dispensing an animal attractant in accordance with an embodiment of the present invention.

Turning now to FIG. 6, an illustrative example of a method for loading shot material into an apparatus for dispensing an animal attractant in accordance with an embodiment of the present invention. In this illustration a user is shown loading the apparatus with shot material by scooping shot material out of a container.

Figure 7:
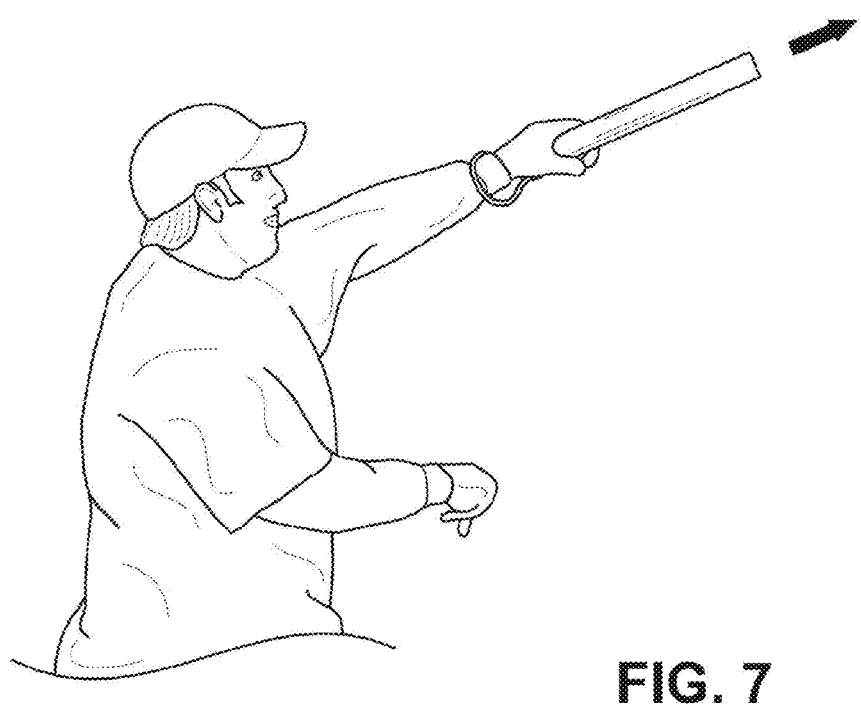
FIG. 7 is an illustrative example of a method for casting shot material in accordance with an embodiment of the present invention.

Turning now to FIG. 7, an illustrative example of a method for casting shot material in accordance with an embodiment of the present invention. In this illustration, as user has already loaded shot material into the apparatus for dispensing an animal attractant. To disperse the shot material, the user cocks the apparatus at a forward angle behind their head. It is important to keep the dispenser chamber of the apparatus at an upward angle to prevent the spilling of any shot material. The user then casts the apparatus forward with an upward angle to cause the shot material to be ejected from the dispenser chamber.

Figure 8:
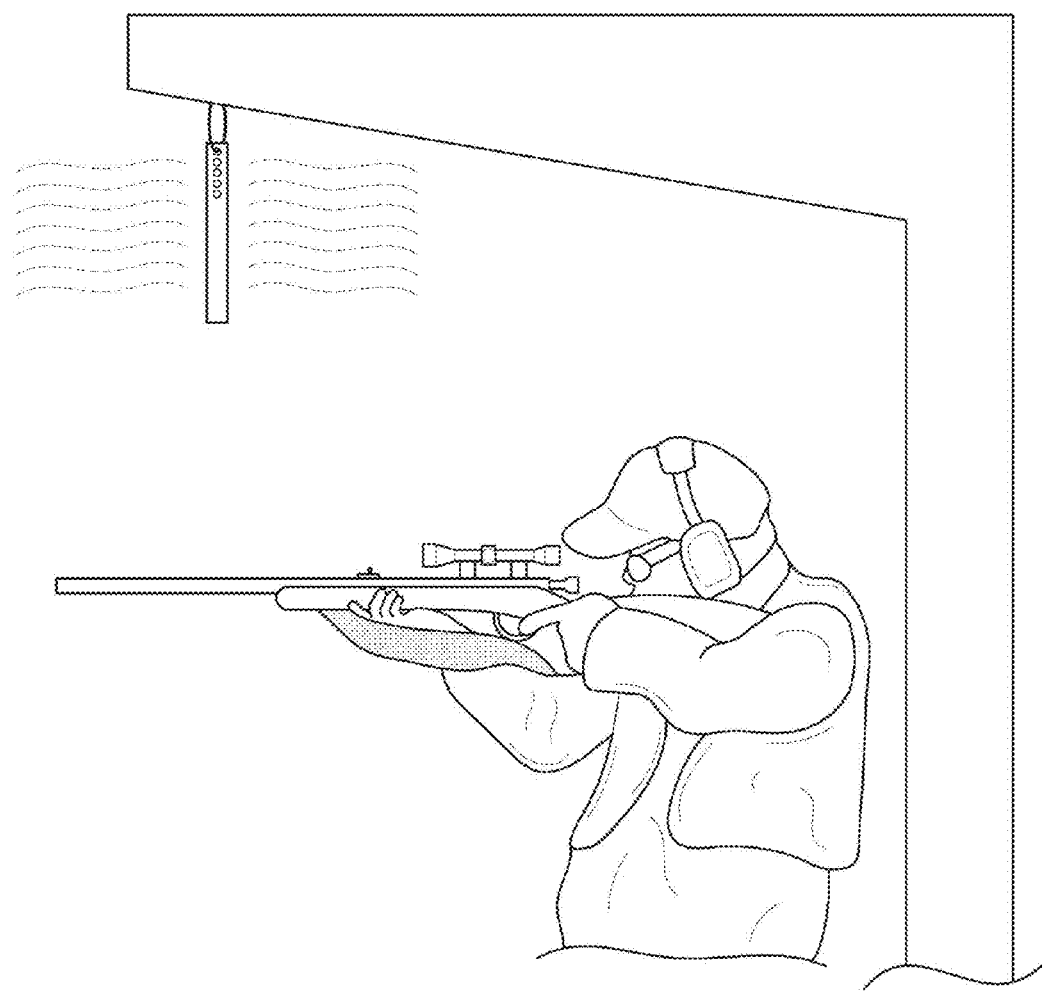
FIG. 8 is an illustrative example of using an apparatus for dispensing an animal attractant as means of providing a cover scent in accordance with an embodiment of the present invention.

Turning now to FIG. 8, an illustrative example of using an apparatus for dispensing an animal attractant as means of providing a cover scent in accordance with an embodiment of the present invention. In this illustration, a user has secured the apparatus near their hunting spot to provide a cover scent. Scent laden shot material has been added to the handle portion of the apparatus and is emanating from the apparatus through one or more cover scent emitting holes located in the handle portion of the apparatus. The cover scent helps to conceal the user's own scent from nearby animals.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. An apparatus for dispensing animal attractant, comprising:
   a tube, comprising a tube divider formed in an interior portion of said tube creating a dispenser chamber and a handle portion,
   wherein said tube divider separates said dispenser portion from said handle portion,
   wherein said dispenser chamber is at a first end of said tube and said handle portion is at a second end of said tube with said first end and second end being on opposite ends of one another, and
   wherein said dispenser portion is configured to receive a shot material via an opening at said first end of said tube and has a uniform diameter between said opening and said tube divider,
   wherein said shot material is dispensed from said apparatus with a casting motion,
   wherein said handle portion is configured as a shot material storage compartment formed with one or more cover scent emitting holes.

2. The apparatus of claim 1, wherein said shot material is a natural material.

3. The apparatus of claim 1, wherein said shot material is a porous material.

4. The apparatus of claim 1, wherein said shot material is configured to retain a scent.

5. The apparatus of claim 1, wherein said dispenser portion is configured with an angled opening.

6. The apparatus of claim 5, wherein said angled opening is configured with an angle between zero and ninety degrees.

7. The apparatus of claim 1, wherein said handle portion is further comprised of a lanyard.

\* \* \* \* \*